United States Patent [19]
Rohs et al.

[11] Patent Number: 5,496,224
[45] Date of Patent: Mar. 5, 1996

[54] TORSIONAL VIBRATION DAMPER

[75] Inventors: Ulrich Rohs, Roonstrasse 11, D-52351 Düren; Dietmar Heidingsfeld, Aachen, both of Germany

[73] Assignee: Ulrich Rohs, Düren, Germany

[21] Appl. No.: 247,048

[22] Filed: May 20, 1994

[30] Foreign Application Priority Data

Jun. 1, 1993 [DE] Germany ............... 43 18 165.1

[51] Int. Cl.⁶ .................................................. F16D 31/04
[52] U.S. Cl. .................... 475/91; 74/574; 192/61; 475/95; 475/108; 475/112
[58] Field of Search ..................... 475/91, 94, 95, 475/106, 108, 112; 192/61; 74/574

[56] References Cited

U.S. PATENT DOCUMENTS 2,743,628  4/1951  Scharaffa ................... 475/91
5,078,246  1/1992  Rohs et al. ................. 192/61

FOREIGN PATENT DOCUMENTS 455030  7/1935  United Kingdom ............. 74/574

*Primary Examiner*—Charles A. Marmor
*Assistant Examiner*—Sherry Estremsky
*Attorney, Agent, or Firm*—Collard & Roe

[57] ABSTRACT

A device for damping torsional vibration of a drive shaft with a liquid damping medium including a primary gear connected to the drive shaft. A secondary gear supports a series of planetary gears in meshed connection with the primary gear. The revolving primary gear and the planetary gears form a gear pump for closed circulation of the liquid damping medium through pressure ducts. The device further includes a control device for controlling the flow rate of the liquid damping medium based on the rotational speed of the primary gear.

22 Claims, 3 Drawing Sheets

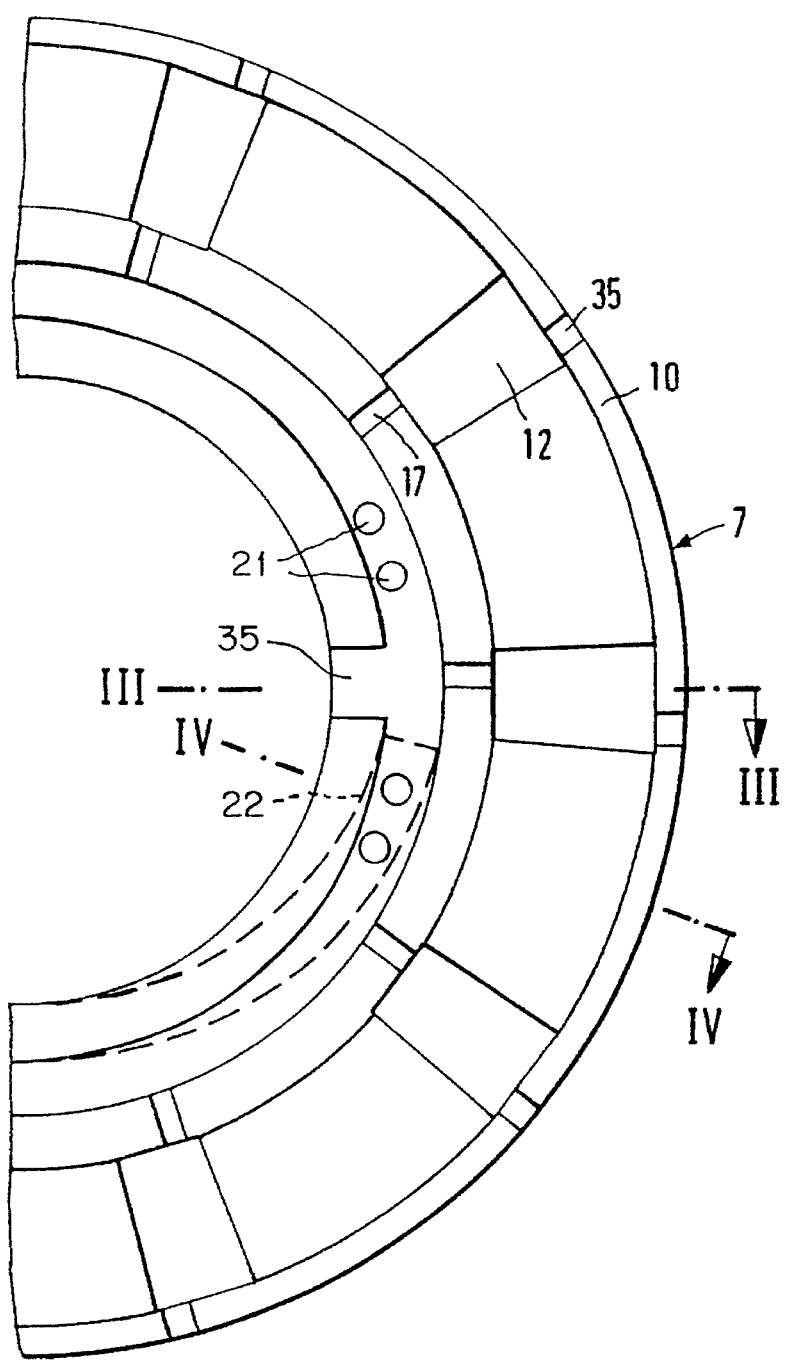
FIG. 2
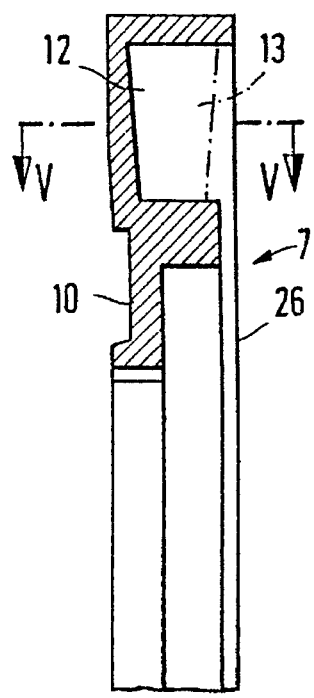
FIG. 3
FIG. 4

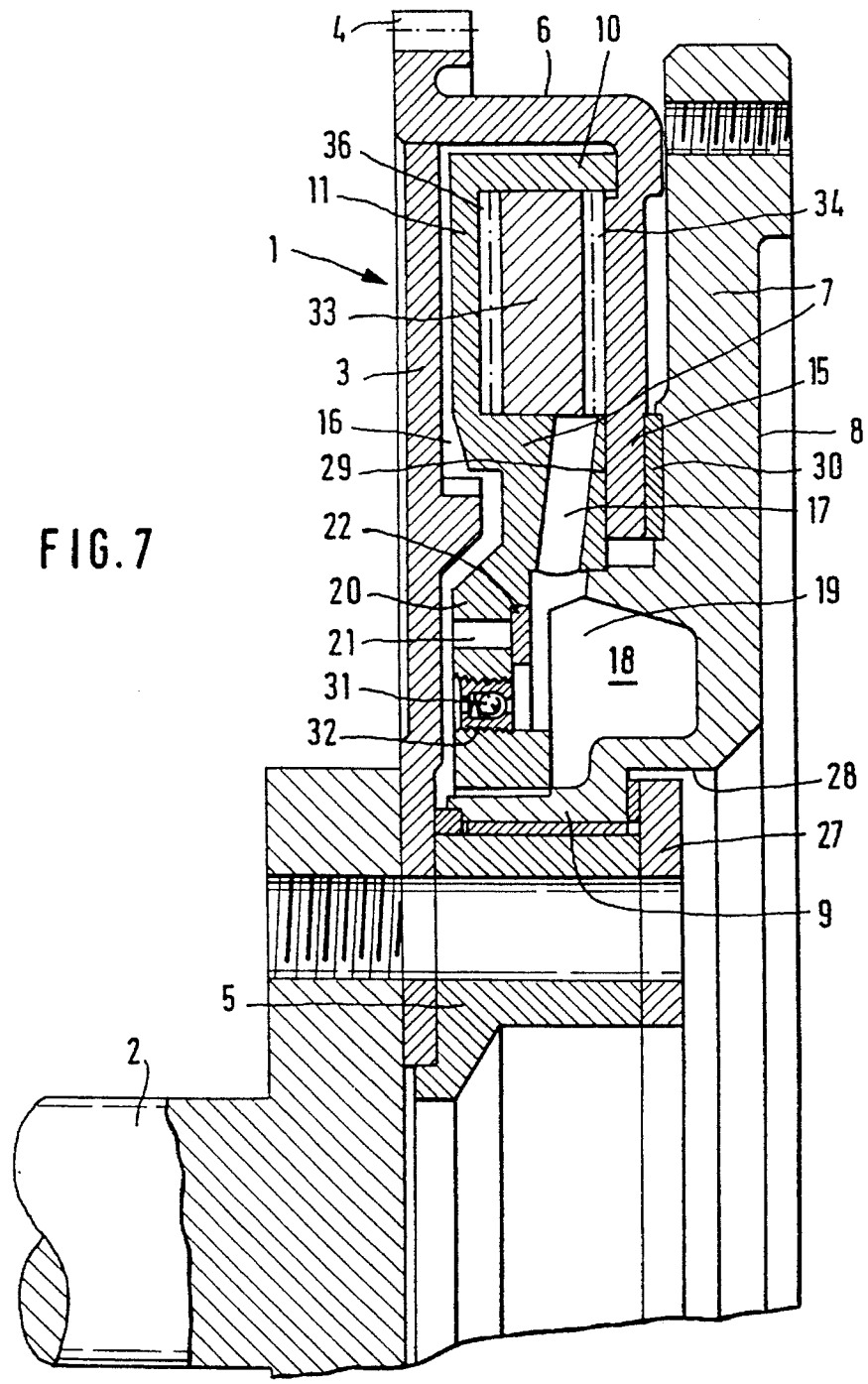

5,496,224

TORSIONAL VIBRATION DAMPER

BACKGROUND OF THE INVENTION

1. Field of the Invention

The present invention relates to a device for damping torsional vibration of a drive shaft. More particularly, it relates to a device where planetary gears form a gear pump for closed circulation of a liquid damping medium.

2. The Prior Art

A device for damping torsional vibration is disclosed in DE 39 18 063 A1, which corresponds to U.S. Pat. No. 5,078,246. In the patented device, the planetary gears are spur gears which mesh with a central ring gear. The spur gears are devoid of an axial journal and are flatly supported between axial face plates in pockets of a planetary gear carrier.

The intake and pressure sides of the gear pumps are present at the radially outwardly disposed mesh point of the planetary gears and the central gear. Each pressure duct is provided with a storage chamber with an elastically changeable volume and is connected with the intake side of the next geared pump. A piston valve throttles each pressure duct. The valve is controlled based on the speed at which the main gear revolves. An excess pressure valve is also provided. Such design requires a large number of precisely made parts which results in higher manufacturing costs.

SUMMARY OF THE INVENTION

It is, therefore, an object of the present invention to provide a torsional vibration damper that can be produced more simply and more inexpensively than known dampers.

It is a further object of the present invention to provide a torsional vibration damper in which the individual components are more simply designed than known dampers and have enhanced operating characteristics.

According to the invention, bevel gears or cylindrical crown gears are used as planetary gears instead of the prior art spur gear. The bevel or crown gears have axes of rotation perpendicular to the axes of rotation of the gears with which they mesh, i.e. the axes of the drive shaft, primary gear and secondary gear. The housing supporting such planetary gears may be substantially simplified in design. Surprisingly, it was discovered that the play of the planetary gears was dependent solely upon the design of a single component, i.e. the planetary gear carrier of the secondary gear. As a result, the precise tolerances between facing walls and other elements are avoided. In this manner, a high pressure hydraulic seal is obtained between the primary and secondary gears. Crown gears offer the additional advantage that they can be manufactured on spur serration production machines.

According to the invention, the device for damping torsional vibration of a drive shaft with a liquid damping medium includes a revolving, primary gear connected to the drive shaft having bevel gear teeth. The device further includes a plurality of planetary gears, each having a central axis of revolution radially aligned with the drive shaft. The planetary gears have a frustoconical shape, with a cross sectional area increasing in the direction away from the drive shaft. The planetary gears may alternatively have a cylindrical shape. A driven, revolving secondary gear has a primary gear carrier, including a plurality of pockets formed therein for supporting the plurality of planetary gears, devoid of axial journals, in meshed connection with the bevel gear teeth.

The revolving primary gear and the plurality of planetary gears form a gear pump for closed circulation of the liquid damping medium through pressure ducts. The primary gear and the secondary gear form a sealed housing, including an intake space for containing the liquid damping medium. The housing also includes means for controlling a flow rate of the liquid damping medium based on the number of revolutions per unit time. The control means is located between the intake space and the pressure ducts. The sealed housing also includes means for eliminating pressure peaks.

The gear carrier includes an intake port, located radially outwardly from the plurality of planetary gears, for admitting the liquid damping medium into the pockets. The pressure ducts are located radially inwardly from the planetary gears. The secondary gear includes a first hub and an annular pressure chamber, surrounding the hub, in communication with the pressure ducts. The intake space is located between parts of the primary gear and the secondary gear. The control means is located between the pressure chamber and the intake space and comprises at least one control device that closes based on the number of revolutions per unit time.

The at least one control device comprises a wall separating the primary gear from the secondary gear and at least one overflow bore formed within the wall. A tightly fitting slotted ring is slidably disposed in the pressure chamber for sealing the at least one overflow bore at a predetermined centrifugal force. The slotted ring is slidable in an axial direction. The wall also has formed within it at least one aperture sealable by a spring-loaded valve.

The primary gear is a disc with an outer edge having a U-shaped radial cross section with a free leg. The free leg is made of sheet metal and is frictionally sealed against the secondary gear. The bevel gear teeth are formed on an inner surface of the free leg. Each pocket has a cross sectional shape including a semi-circular element with two ends and a tangential element extending from each of said two ends. Each pocket includes a longitudinal center plane L that optionally forms a longitudinal dihedral angle $\beta$ with a radial plane S extending from the shaft, whereby one tangential element is shorter than the other.

The primary gear includes a primary hub. The first hub is seated on the primary hub to form a thrust bearing having axial play. The device further includes a bearing ring and the secondary ring includes a coupling part, wherein a side of the edge facing the drive shaft rests against the planetary gear carrier. A side of the edge facing away from the drive shaft is slidably disposed against the bearing ring which is supported on the coupling part to form a fixed thrust bearing.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views:

FIG. 2 is a top plan view of a planetary gear carrier of the secondary gear;

FIG. 3 is a radial cross section of the secondary gear, taken along the line III—III, of FIG. 2;

FIG. 4 is a further radial cross section of the secondary gear, taken along the line IV—IV, of FIG. 2;

FIG. 5 is a cross sectional view of a planetary gear carrier pocket, taken along the line V—V, of FIG. 3;

FIG. 6 is a cross sectional view similar to FIG. 5 showing an alternate embodiment of the planetary gear carrier pocket; and FIG. 7 is a radial cross sectional view, similar to FIG. 1, with cylindrical crown gears.

DETAILED DESCRIPTION OF PREFERRED EMBODIMENTS

Figure 1:
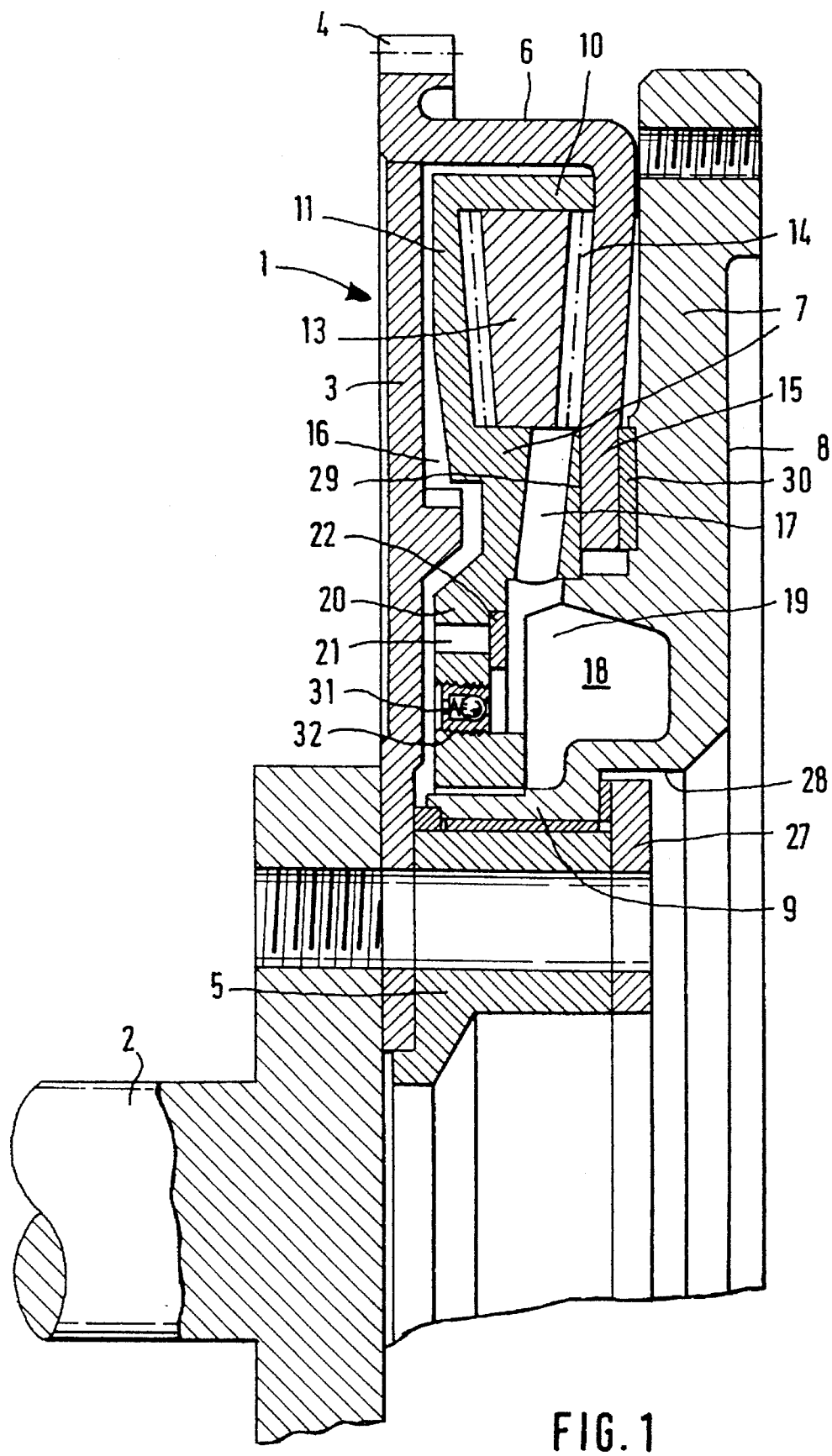
FIG. 1 is a radial cross sectional view through an embodiment of a torsional vibration damper according to the invention.

Referring now in detail to the drawings, and in particular FIG. 1, there is shown a torsional vibration damper having a primary gear 1 including a disk 3 with outer gear teeth 4. Disk 3 is connected to drive shaft 2 and includes a hub 5. An outer edge 6 of disk 3 has a U-shaped radial cross section with a free leg 15 and is advantageously made of sheet steel. The side of a component facing drive shaft 2 shall be referred to as the drive side while the side of a component facing away from drive shaft 2 shall be referred to as the driven side.

A two-part secondary gear 7 is seated on hub 5. Gear 7 consists of a coupling part 8, on the driven side with a concentric hub 9 slidably supported on hub 5, and a planetary gear carrier 10 mounted on hub 9. Gear 7 has an outer edge 11 disposed within U-shaped edge 6. Hub 5 has a flanged end 27 which is disposed within an annular recess 28 of hub 9 and which together form a thrust bearing. Since relatively strong axial vibrations may occur due to bending of engine crank shafts, the thrust bearing is designed with a significant amount of play, for example, in the order of magnitude of 0.6 mm. In this manner, the torsional vibration damper is capable of damping axial vibrations as well.

FIGS. 2, 3 and 4 show that planetary gear carrier 10 is generally disk-shaped and has evenly distributed truncated cone-shaped pockets 12 along edge 11. Pockets 12 widen in the radially outward direction. Pockets 12 accommodate journal-less bevel gears 13 which mesh with matching bevel gear teeth 14 formed on free leg 15 of edge 6. Planetary gears 13 may be designed for pressure compensation in any known manner, for example, with radial bores or axial bores, which are not shown for the sake of clarity.

FIG. 5 shows a cross sectional view of one of the pockets 12. Each pocket is formed from a semicircular element or channel 23 with tangential extensions 24 and 25 extending from each free end of said element. The longitudinal center plane L of pocket 12 coincides with vertical plane S, which extends radially from drive shaft 2 and is disposed transversely to outer side 26 of planetary gear carrier 10. The dihedral angle β between plane L and plane S is zero.

FIG. 6 shows an alternate embodiment where center plane L is offset from the vertical plane S by a non-zero dihedral angle β. In this instance, the leading tangential extensions 25 are shorter than the trailing tangential extensions 24. In this arrangement, planetary gears 13 are sloped further in the pressure direction than in the case of FIG. 5. It is also possible for the longitudinal center plane L to be offset from vertical plane S in the other direction, i.e. where longitudinal center plane L would be located between vertical plane S and tangential extension 25. In the configuration of FIGS. 5 and 6, pockets 12 are easily accessible from the outside with working tools.

On the drive side, planetary gear carrier 10 is bordered by disk 3, and on the driven side by edge 6, as can be seen in FIG. 1. An intake space 16 is formed between disk 3 and edge 6. Intake ports 35 are disposed in the radially outermost zone of intake space 16, as can be seen in FIG. 2.

The free end of leg 15 is frictionally sealed with secondary gear 7. This forms a pressure chamber 18 that is tightly closed on all sides. More specifically, FIG. 1 shows that the drive side of free leg 15 rests against planetary gear carrier 10 and its driven side rests against a bearing ring 30. The bearing ring 30 is supported on coupling part 8 of secondary gear 7.

The thrust bearing thus formed by coupling part 8, planetary gear carrier 10, and free leg 15 is designed as a fixed bearing. This is accomplished through suitable surface design or material selection, such that minimal sliding friction occurs between planetary gear carrier 10 and the drive side 29 of free leg 15. In this case, the thrust bearing formed by end 27 and annular recess 28 could be omitted.

Pressure ducts 17 extend from the innermost radial end of pocket 12 to feed the liquid damping medium to an annular pressure chamber 18. Annular pressure chamber 18 is arranged within coupling part 8 and extends around hub 9 and is subdivided by radial webs 19. On the drive side, pressure chamber 18 is limited by a disk-shaped separation wall 20 of planetary gear carrier 10.

At least one overflow bore 21 is formed within separation wall 20. Overflow bore 21 may be sealed by a ground, slotted ring 22. Ring 22 is movably supported axially. Ribs 19 are shaped in such a way that they limit the axial movement of ring 22. On the drive side, pressure chamber 18 is limited by a disc-shaped portion 20 of the planetary gear carrier 10.

Within this portion 20, at least one overflow bore 21 is formed, which may be sealed by a ground ring 22 which has a slot 35 (FIG. 2). Ring 22 is axially movably supported. Ribs 19 within pressure chamber 18 are shaped in such a way that they limit the axial movement of ring 22 (FIG. 1).

Excess pressure within the pressure chamber 18 forces ring 22 flatly and axially tightly-fitting against said portion 20. At high speeds, the ends (FIG. 2) of slotted ring 22 move outwardly due to the centrifugal force and close overflow bores 21. FIG. 2 shows the normal position of said ends of ring 22 and in dotted lines, one of the ends in a closing position.

When a change in load occurs, the overflow bore(s) 21 may be opened at the suction side by the axial movement of ring 22 back toward rib 19 (due to a loss of pressure in the pressure chamber 18.)

At least one additional bore 32 is located within separation wall 20. A spring-loaded check valve 31 is disposed within bore 32 and operates as an excess pressure valve.

Annular pressure chamber 18 is dimensioned so that it has a substantially larger volume than the delivery volume of a bevel gear per one rotation of primary gear 1. This ratio, which is referred to as the kappa ratio, amounts to about 5 and is, therefore, considerably lower than that of known designs where the device for controlling the liquid flow is dependent on the number of revolutions associated with each gear pump. However, the individual volume of each pump is very low. The annular pressure chamber 18, according to the invention, assumes a function of such devices. Due to the central feed of pressure conduits 17, the damping medium is pumped into pressure chamber 18, which acts like a centerfuge to move the damping medium radially outward. This also causes a mixing of the damping medium with air, which provides an elastic storage effect.

FIG. 1 shows that the shear surface between disk 3 and secondary disk 7 is very small so that the liquid friction is low as well. Nearly all of the spiral springs, oscillating piston devices and wedges customarily used with such systems are avoided, so that the device may be economically manufactured.

FIG. 7 shows an alternate embodiment where cylindrical crown gears 33 are used in place of frustoconical gears 13. Cylindrical crown gears 33 are disposed with correspondingly shaped cylindrical pockets 36. Free leg 15 is provided with bevel gear teeth 34 which can be formed in a non-cutting way on said leg.

While several embodiments of the present invention have been shown and described, it is to be understood that many changes and modifications may be made thereunto without departing from the spirit and scope of the invention as defined in the appended claims.

What is claimed is:

1. A device with a liquid medium for damping torsional vibration of a drive shaft, the device comprising:

a revolving, primary gear connected to the drive shaft and including bevel gear teeth;

a plurality of planetary gears, each having a central axis of revolution radially aligned with the drive shaft and a frustoconical shape with a cross sectional area increasing in a direction away from the drive shaft; and a driven, revolving secondary gear having a planetary gear carrier including a plurality of pockets formed therein for supporting said plurality of planetary gears devoid of axle journals in meshed connection with said bevel gear teeth, said revolving primary gear and said plurality of planetary gears forming a gear pump for closed circulation of the liquid damping medium through pressure ducts, and said primary gear and said secondary gear forming a sealed housing, including
(i) an intake space for containing the liquid damping medium,
(ii) means for controlling a flow rate of the liquid damping medium based on the number of revolutions per unit time, said control means being located between the intake space and the pressure ducts, and
(iii) means for eliminating pressure peaks.

2. The device according to claim 1, wherein said gear carrier includes intake ports, located radially outwardly from said plurality of planetary gears, for admitting the liquid damping medium into the pockets, and wherein said pressure ducts are located radially inwardly from said planetary gears.

3. The device according to claim 2, wherein said secondary gear includes a first hub and an annular pressure chamber surrounding said first hub and in communication with said pressure ducts, wherein the intake space is located between parts of said primary gear and said secondary gear, and said control means is located between said pressure chamber and the intake space and comprises at least one control device that closes based on the number of revolutions per unit time.

4. The device according to claim 3, wherein said at least one control device comprises:

at least one overflow bore located in a disc-shaped portion of the planetary gear carrier which limits the pressure chamber and opens to said first gear; and an axially tightly-fitting slotted ring slidably disposed within the pressure chamber for sealing said at least one overflow bore at a predefined centrifugal force.

5. The device according to claim 4, wherein said slotted ring is slidable in an axial direction.

6. The device according to claim 5, wherein said means for eliminating pressure peaks comprises at least one aperture sealable by a spring-loaded valve.

7. The device according to claim 6, wherein said primary gear is a disk with an outer edge having a U-shaped radial cross section with a free leg, said free leg is made of sheet metal and is frictionally sealed against said secondary gear, and said bevel gear teeth are formed on an inner surface of said free leg.

8. The device according to claim 7, wherein each pocket has a cross sectional shape including a semicircular element with two ends and a tangential element extending from each of said two ends.

9. The device according to claim 8, wherein each pocket includes a longitudinal center plane L that forms a longitudinal dihedral angle $\beta$ with a radial plane S, extending from the shaft, whereby one tangential element is shorter than the other.

10. The device according to claim 9, wherein said primary gear includes a primary hub, said first hub being seated on said primary hub to form a thrust bearing having axial play.

11. The device according to claim 10, further including a bearing ring, wherein said secondary gear includes a coupling part, and wherein a side of said edge facing the drive shaft rests against said planetary gear carrier and a side of said edge facing away from the drive shaft is slidably disposed against said bearing ring which is supported on said coupling part and forms a fixed thrust bearing.

12. A device with a liquid medium for damping torsional vibration of a drive shaft, the device comprising:

a revolving, primary gear connected to the drive shaft and including bevel gear teeth;

a plurality of planetary gears, each having a central axis of revolution radially aligned with the drive shaft and a cylindrical shape; and a driven, revolving secondary gear having a planetary gear carrier including a plurality of pockets formed therein for supporting said plurality of planetary gears devoid of axle journals in meshed connection with said bevel gear teeth, said revolving primary gear and said plurality of planetary gears forming a gear pump for closed circulation of the liquid damping medium through pressure ducts; and said primary gear and said secondary gear forming a sealed housing, including
(i) an intake space for containing the liquid damping medium,
(ii) means for controlling a flow rate of the liquid damping medium based on the number of revolutions per unit time, said control means being located between the intake space and the pressure ducts, and
(iii) means for eliminating pressure peaks.

13. The device according to claim 12, wherein said gear carrier includes intake ports, located radially outwardly from said plurality of planetary gears, for admitting the liquid damping medium into the pockets, and wherein said pressure ducts are located radially inwardly from said planetary gears.

14. The device according to claim 13, wherein said secondary gear includes a first hub and an annular pressure chamber surrounding said first hub and in communication with said pressure ducts, wherein the intake space is located between parts of said primary gear and said secondary gear, and said control means is located between said pressure chamber and the intake space and comprises at least one control device that closes based on the number of revolutions per unit time.

15. The device according to claim 14, wherein said at least one control device comprises:

a wall separating said primary gear from said secondary gear and at least one overflow bore located within said wall; and an axially tightly-fitting slotted ring slidably disposed within the pressure chamber for sealing said at least one overflow bore at a predefined centrifugal force.

16. The device according to claim 15, wherein said slotted ring is slidable in an axial direction.

17. The device according to claim 16, wherein said means for eliminating pressure peaks comprises at least one aperture sealable by a spring-loaded valve.

18. The device according to claim 17, wherein said primary gear is a disk with an outer edge having a U-shaped radial cross section with a free leg, said free leg is made of sheet metal and is frictionally sealed against said secondary gear, and said bevel gear teeth are formed on an inner surface of said free leg.

19. The device according to claim 18, wherein each pocket has a cross sectional shape including a semicircular element with two ends and a tangential element extending from each of said two ends.

20. The device according to claim 19, wherein each pocket includes a longitudinal center plane L that forms a longitudinal dihedral angle $\beta$ with a radial plane S, extending from the shaft, whereby one tangential element is shorter than the other.

21. The device according to claim 20, wherein said primary gear includes a primary hub, said first hub being seated on said primary hub to form a thrust bearing having axial play.

22. The device according to claim 21, further including a bearing ring, wherein said secondary gear includes a coupling part, and wherein a side of said edge facing the drive shaft rests against said planetary gear carrier and a side of said edge facing away from the drive shaft is slidably disposed against said bearing ring which is supported on said coupling part and forms a fixed thrust bearing.

* * * * *